United States Patent
Kudija, Jr. et al.

(10) Patent No.: US 6,594,984 B1
(45) Date of Patent: Jul. 22, 2003

(54) COMBINED THRUST AND POWER GENERATOR FOR A SATELLITE

(75) Inventors: Charles T. Kudija, Jr., Santa Clarita, CA (US); Patrick Edward Frye, Simi Valley, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/047,776

(22) Filed: Jan. 15, 2002

(51) Int. Cl.[7] ................................................ F02K 9/42
(52) U.S. Cl. ....................................................... 60/203.1
(58) Field of Search ........................................ 60/203.1

(56) References Cited

U.S. PATENT DOCUMENTS

| | | | |
|---|---|---|---|
| 4,815,443 A | | 3/1989 | Vrolyk et al. |
| 5,138,832 A | * | 8/1992 | Pande ........................ 60/203.1 |
| 5,459,996 A | | 10/1995 | Malloy, III et al. |
| 6,065,284 A | * | 5/2000 | Horner et al. ............. 60/203.1 |
| 6,290,185 B1 | * | 9/2001 | DeMars et al. ............ 60/203.1 |
| 6,311,476 B1 | * | 11/2001 | Frye et al. .................. 60/203.1 |
| 6,343,464 B1 | * | 2/2002 | Westerman et al. ........ 60/203.1 |
| 6,412,274 B1 | * | 7/2002 | Miller et al. ............... 60/203.1 |

* cited by examiner

*Primary Examiner*—Michael Koczo
(74) *Attorney, Agent, or Firm*—Alston & Bird LLP

(57) ABSTRACT

A combined generator device for use in a satellite capable of generating electrical power and thrust from an optical solar image. The combined generator includes a first receiver positioned to receive and store the outer, low-intensity region of the optical solar image. An electrical power generator thermally coupled to the first receiver uses the stored thermal energy to produce electricity. The combined generator also includes a thrust generator having a second receiver. The second receiver is positioned to receive and absorb the inner, high-intensity region of the optical solar image. A heat exchanger of the combined generator transfers the thermal energy from the second receiver into a supply of propellant which is vented to a nozzle to produce thrust.

22 Claims, 4 Drawing Sheets

COMBINED THRUST AND POWER GENERATOR FOR A SATELLITE

FIELD OF THE INVENTION

The present invention relates to the use of generators to produce electrical power or thrust in aerospace craft, and more particularly, to generators for converting solar power to electrical power or thrust for a satellite.

BACKGROUND OF THE INVENTION

Satellite systems typically have to operate a range of electrical devices and generate thrust in order to perform the various tasks laid out for them in a mission. For instance, a supply of propellant must be heated to produce the thrust necessary to move the satellite, or to change the attitude of the satellite. In addition, electrical devices used for various tasks require a supply of electricity. It is highly desirable to conserve satellite size and mass due to the need to place each satellite into orbit via an expensive launch vehicle. Therefore, the use of readily available solar power is typically desired over launching batteries, or other heavy and bulky power storage equipment. Prior art satellite systems have disclosed separate power and thrust generation systems which generally present a less efficient use of the limited size and mass payload capabilities of launch vehicles.

U.S. Pat. No. 5,459,996 to Malloy, III et al. discloses a satellite system that uses the same thermal storage device for alternatively generating thrust or electrical power. The satellite system includes a pair of mirror assemblies 50 that focus sunlight through a pair of windows 36 defined by a receiver 30. The receiver includes a hollow thermal storage drum 32 that defines an internal wall of the receiver, as shown in FIG. 2 of Malloy, III et al. The thermal storage drum absorbs radiant energy from sunlight entering through the windows, converts the radiant energy into thermal energy and subsequently retains the thermal energy for generation of electrical power or thrust. The thermal storage drum is encased by a removable diode insulation sleeve 40 which is retractable over the outer periphery of the thermal storage drum. An energy conversion medium 42 is located at the outer periphery of the insulation sleeve and converts the radiant energy stored in the thermal storage drum into electrical power when the insulation sleeve is retracted, as shown in FIG. 4 of Malloy, III et al.

During an alternative thrust mode, the insulation sleeve is returned to its original (unretracted) position, as shown in FIG. 3, which halts the production of electrical power. Propellant from a propellant supply is routed through the tubes 22 at the bottom of the receiver so that the propellant removes heat produced and stored by the thermal storage drum. The heated propellant is routed out of the receiver and into a nozzle 28 at the top of the receiver so as to produce thrust. Although advantageously reducing the mass of the satellite by combining thrust and electrical power generation in a single receiver, the satellite system disclosed by Malloy, III et al. does not generate thrust and electrical power simultaneously.

It would be advantageous to have a combined thrust and electrical power generation device for a satellite system. Further, it would be advantageous if the combined generation device were capable of simultaneously generating both thrust and electrical power for a satellite system. Such a simultaneous generation of thrust and electrical power would allow full operation of the satellite's electrical devices even during movement of the satellite, or changes in its attitude. It would be further advantageous if the generation device used ambient solar radiation to generate the thrust and electrical power, reducing the need to carry additional fuel or power storage devices during launch of the satellite system into orbit.

SUMMARY OF THE INVENTION

The present invention addresses the above needs and achieves other advantages by providing a combined generator device for use in a satellite capable of generating electrical power and thrust from an optical solar image. The combined generator includes a first receiver positioned to receive and store the outer, low-intensity region of the optical solar image. An electrical power generator thermally coupled to the first receiver uses the stored thermal energy to produce electricity. The combined generator also includes a thrust generator having a second receiver. The second receiver is positioned to receive and absorb the inner, high intensity region of the optical solar image. A heat exchanger of the combined generator transfers the thermal energy from the second receiver into a supply of propellant which is vented to a nozzle to produce thrust.

In one embodiment, the present invention includes a combined generator device for use in a satellite. The combined generator device is capable of generating electrical power and propulsion from an optical solar image having a high-intensity region and a low intensity region. A solar concentrator of the combined generator device is configured to direct and focus the two regions of the optical solar image onto a focal plane. Positioned at the focal plane is a first receiver that includes a first radiant energy absorbing member. The first radiant energy absorbing member is positioned so as to receive the focused low-intensity region of the optical solar image. The first receiver further includes a thermal storage medium operably connected to the first radiant energy absorbing member so as to be able to store the thermal energy absorbed by the first radiant energy absorbing member. An electrical power generator of the combined generator device is thermally coupled to the first receiver, receives thermal energy from the first receiver, and is configured to convert the thermal energy into electrical power. The combined generator device also includes a propulsion generator having a second receiver and a propellant supply. The second receiver includes a second radiant energy absorbing member positioned at the focal plane so as to receive the high-intensity region of the optical solar image. The propellant supply is thermally coupled with the second receiver and receives thermal energy from the second receiver which heats the propellant to produce thrust.

The first radiant energy absorbing member may define a first cavity having an aperture positioned at the focal plane. In such a case, the second radiant energy absorbing member of the second receiver is positioned within the first cavity. Preferably, the first cavity defined by the first radiant energy absorbing member is a cylindrical cavity, wherein the second receiver is concentrically positioned within the first cavity. The second radiant energy absorbing member may also define a cylindrical cavity. The thermal energy storage medium, such as graphite, is layered around an outer surface of the first radiant energy absorbing member. The first and second radiant energy members are constructed of a refractory material, such as rhenium.

The thrust generator may include a heat exchanger thermally coupled with the second radiant energy absorbing member and in fluid communication with the propellant supply. Propellant passing through the heat exchanger is heated by the second radiant energy absorbing member so as to produce thrust. To aid in the production of thrust, the propellant may be pre-heated by a pre-heat exchanger thermally coupled with the first radiant energy absorbing member. The pre-heat exchanger is also connected in fluid communication with the propellant supply, but upstream of the heat exchanger. After heating, the propellant is typically directed by a thrust nozzle this in fluid communication with the propellant supply and is downstream from both the pre-heat exchanger and the heat exchanger.

The present invention has several advantages. The combined thrust and power generator can simultaneously generate thrust and electrical power by using the high-intensity and low-intensity regions of the solar image. Such use of the naturally varying intensity of the ambient solar image optimizes the efficient use of radiant heat generated by the solar image. In other words, the low-intensity region of the solar image is not wasted, but is directed to electrical power generation which does not require the thermal energy associated with the higher temperature, while the high intensity region of the solar energy is directed to thrust generation which prefers the thermal energy associated with the higher temperature. In addition, the combination of functions reduces the size and mass of the generator, which reduces the expense of launching the satellite. No moving parts are required to alternate between two different power and thrust generation modes, increasing the reliability of the combined generator. A circular first and second radiant energy absorbing members of one advantageous embodiment match the circular solar image, thereby reducing any loss of the solar image that fails to hit an energy absorbing member. Pre-heating of the propellant reduces the thermal energy needed to achieve a target propellant temperature for the production of thrust.

BRIEF DESCRIPTION OF THE DRAWINGS

Figure 1:
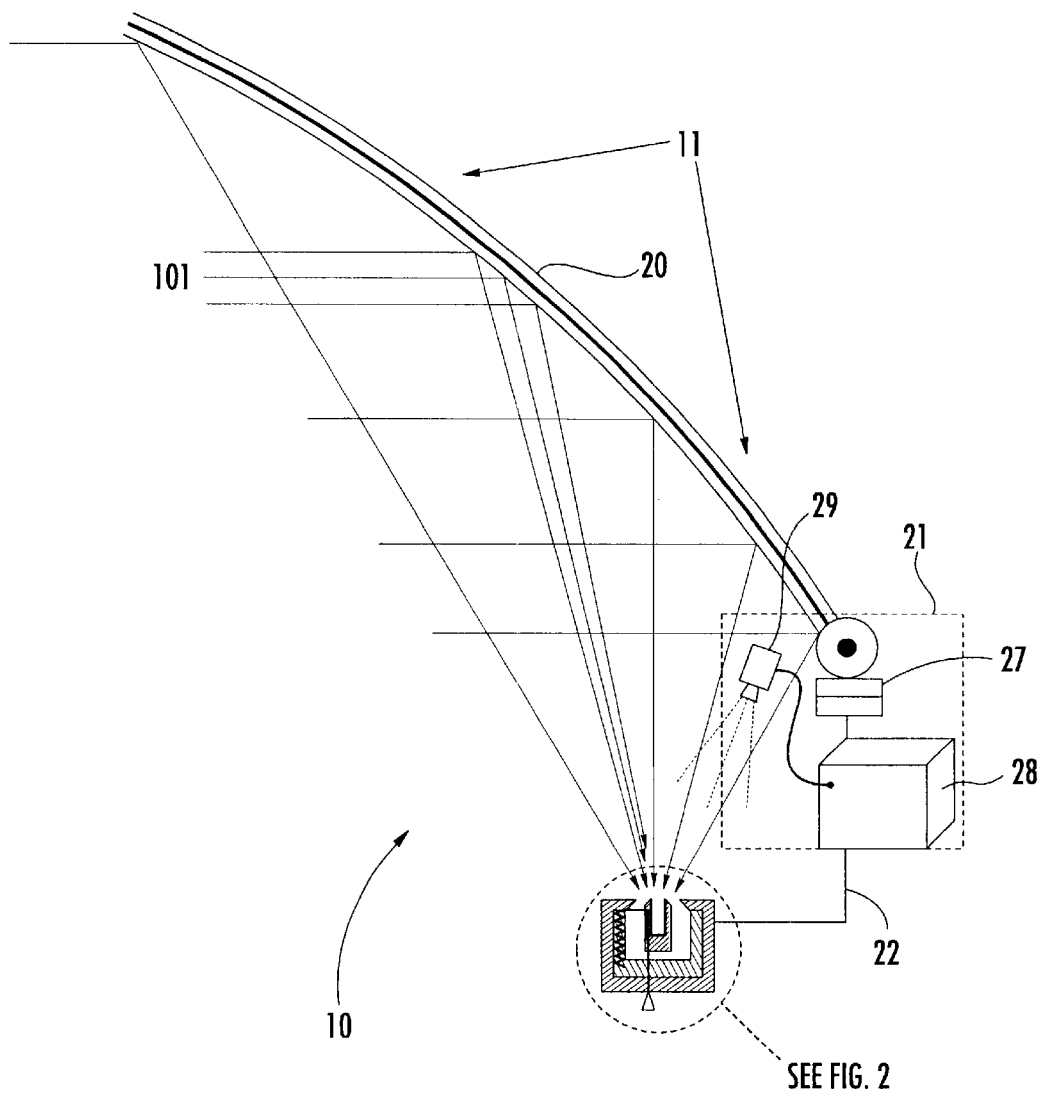
Figure 2:
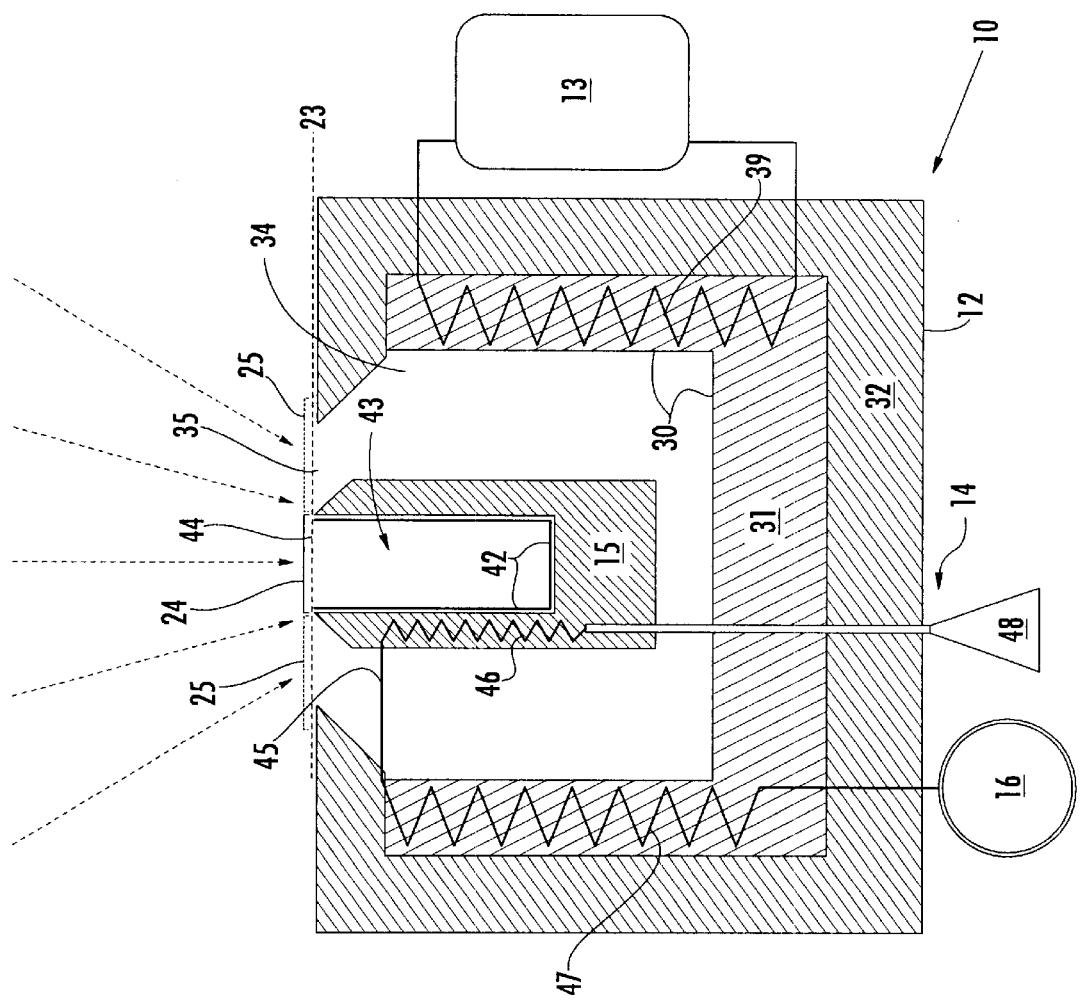
Figure 3:
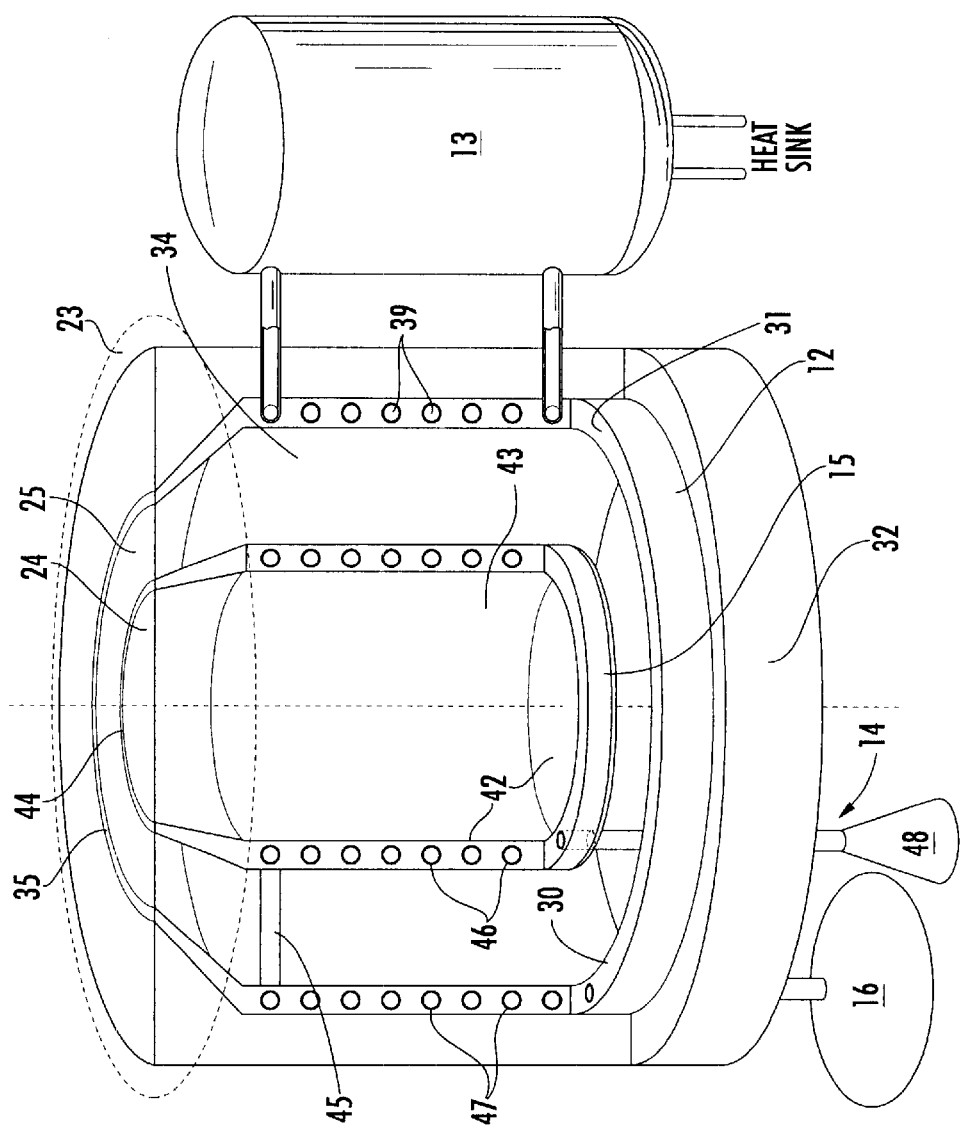
Figure 4:
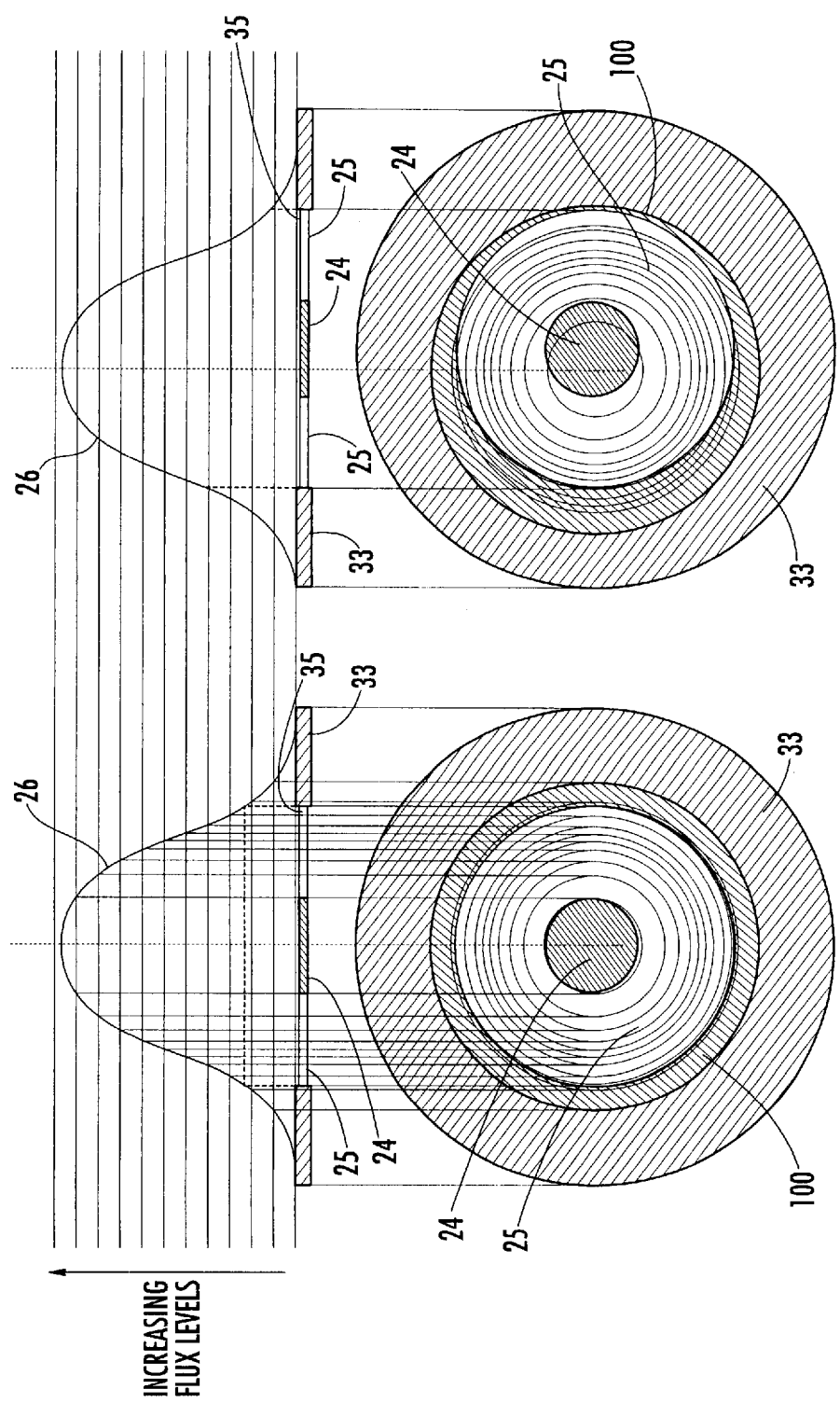

Having thus described the invention in general terms, reference will now be made to the accompanying drawings, which are not necessarily drawn to scale, and wherein:

FIG. 1 is a schematic depicting a combined thrust and electrical power generator of one embodiment of the present invention; and FIG. 2 is an enlarged schematic of a pair of receivers of the combined thrust and electrical power generator of FIG. 1;

FIG. 3 is a sectional view of the pair of receivers of FIG. 2;

FIG. 4 is a graphical depiction of the positioning of the optical solar image, including a low-intensity region and a high-intensity region, on a pair of receivers of the combined generator shown in FIG. 1.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A combined generator device 10 of one embodiment of the present invention for simultaneously generating electrical power and thrust is shown in FIG. 1. The combined generator device includes a solar concentrator 11 to direct and focus an optical solar image 100 onto a first receiver 12 that powers an electrical power generator 13 and further includes a second receiver 15 of a thrust generator 14 for heating propellant supplied from a propellant tank 16, as shown in FIGS. 2 and 3. Preferably, the combined generator device 10 is employed as part of an orbiting spacecraft, such as a satellite, that can receive a relatively undiluted optical solar image. However, the generator device can also be used with machines, including aerospace craft, benefiting from the generation of thrust and electrical power and having a supply of radiant energy, such as sunlight.

The solar concentrator 11 includes a mirror 20 for redirecting solar rays 101 onto the receivers 12, 15, as shown in FIG. 1. The ambient optical solar image has a natural radiant heat intensity that is highest at its center and decreases in the radial direction. Preferably, the mirror 20 has a parabolic shape to preserve the radiant energy distribution of the solar image and is concave so as to focus the solar image 100 for greater radiant intensity, as shown by a flux profile curve 26 of FIG. 4. As will be described in more detail later, the focused solar image may be split up into areas of different average radiant energy intensity. Preferably, the solar image 100 is split into two regions on the focal plane 23, a region of greater intensity (a high-intensity region) 24 and a region of lesser intensity (a low-intensity region) 25. The region of greater intensity 24 is a circular region at the center of the solar image 100, while the region of lesser intensity 25 is the annular ring surrounding the region of greater intensity. Other devices for directing and focusing light could be used in place of the parabolic, concave mirror 20. For instance, a refractive lens or an array of multiple flat mirrors with varying orientation may be used to direct and focus the solar image 100.

The solar concentrator 11 also includes a pointing system 21 for adjusting the position of the mirror 20 to compensate for changing satellite attitude and movement of the optical solar image 100. The pointing system 21 includes a motorized gripping and movement device 27 attached to the first receiver 12 by a support structure 22 and controlled by a controller processing element 28 in communication with an optical sensor 29. The motorized movement device 27 includes a collection of motors, preferably electrical motors, for moving the mirror 20 through at least two degrees of rotational freedom in response to commands from the processing element 28. The processing element 28 receives input on the location of the optical solar image 100 via the optical sensor 29 which is positioned to sense the position of the solar image on the receivers 12, 15. As the optical solar image 100 begins to drift away from a centered position, as shown on the right hand side of FIG. 4, the image of the solar flux that spills onto the front of the receiver outside the apertures is captured by the optical sensor 29. The processing element 28 subtracts the portion of the image that falls within the aperture from the entire image. The centroid and amount of the spilled flux is calculated relative to the known center of the aperture, thereby generating an error signal that gives both distance and direction for transformation into a pointing correction signal. The processing element then commands the motorized movement device 27 to change the orientation of the mirror 20.

The first receiver 12 includes a first radiant energy absorbing member 30, a thermal storage medium 31 and an insulating layer 32, as shown in FIGS. 2 and 3. The radiant energy absorbing member 30 defines a first cavity 34 having an aperture 35 positioned at the focal plane 23. Preferably, the first cavity 34 has a cylindrical shape and the aperture, at one end of the cavity, has a circular shape so as to receive the entire annular region of lesser intensity 25 of the optical solar image 100. The radiant energy absorbing member 30 is preferably constructed of a thin, cylindrical shell or coating that quickly conducts heat to the surrounding thermal storage medium 31. Preferred materials for the radiant energy absorbing member 30 include super alloys, refractories or ceramics that will tolerate high operating temperatures and that are responsive to the optical solar image 100 to produce thermal energy. More preferably, the absorbing member 30 is constructed of a refractory material, such as a coating of the element rhenium. Optionally, the radiant energy absorbing member 30 may be an annul disk. However, the shape of the cavity 34 defined by the member 30 functions as a black body, trapping and absorbing the solar light within the cavity with minimal losses due to reflection. Optionally, the aperture 35 may be formed by an annular aperture plate 33 that may also include a transparent cover (not shown) that extends over the aperture 35 to protect the receivers 12, 15 from debris.

The thermal energy storage medium 31 is layered around the first radiant energy absorbing member 30, as shown in FIGS. 2 and 3. The layer of the medium 31 forms a cylindrical shape so as to conform to the preferred shape of the first radiant energy absorbing member 30. Such a configuration allows the storage medium 31 to receive thermal energy from the first member 30 via conduction. Preferably, the storage medium 31 is a material that melts at much higher temperatures than most materials, such as graphite. Optionally, the storage medium 31 may store energy through a solid-liquid phase change by using a salt, such as lithium fluoride, or a metal such as silicon. Escape of the stored thermal energy from the storage medium 31 is prevented through the use of the outer insulating layer 32. A range of different insulating materials can be used for this purpose such as multiple layers of low absorptivity foil, or materials having a relatively low thermal conductivity, singly or in combination. Preferably, the insulating layer covers the outer surfaces of the storage medium 31 so as to thermally isolate the member 30 and storage medium 31 from the ambient environment.

The thermal energy produced by the first receiver 12 is converted into electrical power by the electrical power generator 13. The electrical power generator includes a heat exchanger 39 embedded in the thermal storage medium 31. The heat exchanger 39 typically includes a coil of thin walled tubing embedded in the thermal storage medium 31 through which a fluid flows. In such a case, a phase change or rise in temperature of the fluid allows the fluid to carry thermal energy back to the rest of the electrical power generator 13 which uses the thermal energy to produce electricity. There are many different systems that can generate electrical power from thermal energy and that could be used for the electrical power generator 13 of the present invention. The present invention is not intended to be limited to any one type of electrical power generator. Such electrical power generators are known in the art and are therefore not described in more detail herein. In addition, the electrical power generator 13 may be thermally coupled to the thermal storage medium 31 using systems other than the heat exchanger 39. For instance, the electrical power generator 13 could be in close enough proximity to the thermal storage medium that passive conduction provides the thermal energy necessary to generate electrical power.

The thrust generator 14 includes the second receiver 15 which heats propellant supplied by the propellant tank 16 to produce thrust. The second receiver 15 includes a second radiant energy absorbing member 42 positioned at the focal plane 23 and in the region of greater intensity 24 of the solar image 100, as shown in FIG. 4. Preferably, the second radiant energy absorbing member 42 has a circular shape at the focal plane 23 so as to match the preferred undistorted shape of the high-intensity region 24 of the solar image 100. Location of the second radiant energy absorbing member 42 concentric with the cylindrical first cavity 34 ensures that the second member is positioned to receive the highest intensity regions of the optical solar image 100 when the solar image is properly positioned by the pointing system 21, as described above. Optionally, the second radiant energy absorbing member 42 may define a second cavity 43 including a second aperture 44 positioned at the focal plane and receiving the high-intensity region 24 of the solar image 100. Similar to the first cavity 34 of the first radiant energy absorbing member 30, the second cavity 43 forms a black body cavity that minimizes reflected losses of the high-intensity region 24 of the solar image 100. A further option includes a second thermal storage medium surrounding the second radiant energy absorbing member 42 and storing thermal energy absorbed thereby. Preferred materials for the second radiant energy absorbing member 42 include super alloys, refractories or ceramics that will tolerate high operating temperatures and are responsive to the optical solar image 100 to produce thermal energy. More preferably, the absorbing member 42 is constructed of a refractory material, such as a coating of the element rhenium.

Preferably, the first radiant energy absorbing member 12 has a circular diameter that is 1.4 times the diameter of the second radiant energy absorbing member 42. A range of other shapes and sizes may be used for the radiant energy absorbing members, and the radiant energy absorbing members may be positioned at other locations than a common focal plane. Generally, the relative sizes and shapes of the energy absorbing members are based on anticipated electrical power and thrust needs. For instance, the sizing of the two apertures 35, 44 can be dictated by balancing the spread of the concentrated solar flux with the intended operating temperature of the two cavities 34, 43. In addition, other practicalities, such as space constraints, may require the use of non-circular absorbing members, such as square or rectangular absorbing members.

The thrust generator 14 also includes a heat exchanger 46 embedded in the second receiver 15 that is in fluid communication with the propellant tank 16. For instance, the heat exchanger 46 may be connected at an inlet end to a propellant supply line 45 that passes through the first cavity 34 and into the second receiver 15, as shown in FIGS. 2 and 3. The heat exchanger 46 may have many different configurations, but typically will include a series of coils through which the propellant flows and receives thermal energy from the surrounding receiver 15. The exit end of the heat exchanger 46 is in fluid communication with an exhaust nozzle 48, or other propellant directing device, that produces and directs thrust from the heated propellant. The thrust generator 14 may further include a second, pre-heat exchanger 47 for pre-heating the propellant before it enters the heat exchanger 46.

The combined generator device 10 of the present invention can be used to simultaneously generate thrust and electrical power for a satellite from the optical solar image 100. The pointing system 21 adjusts the positioning of the mirror 20 to focus and direct the optical solar image 100 onto the focal plane 23. The processing element 28 receives input on the location of the optical solar image 100 via the optical sensor 29. The processing element 28 determines the necessary change in orientation needed to re-center the optical solar image by applying transformations to the direction and magnitude of the drift distance. The processing element then commands the motorized movement device 27 to change the orientation of the mirror 20 to center, or re-center, the optical solar image so that the high-intensity region 24 is on the second receiver 25 and the low-intensity region 12 is on the first receiver 12.

The radiant energy from the low-intensity region 25 of the optical solar image 100 is captured in the cavity 34 of the first receiver 12 and converted to thermal energy which is conducted into the surrounding thermal storage medium 31. The heat exchanger 39 of the electrical power generator collects thermal energy from the thermal storage medium 31 and the thermal energy is used to generate electrical power. Simultaneously, the radiant energy from the high-intensity region 24 is captured in the cavity 43 of the second radiant energy absorbing member 42. Propellant may be routed from the propellant tank 16 through the pre-heat exchanger 47 where thermal energy is transferred from the thermal storage medium 31 into the propellant. The propellant is further routed through the propellant supply line 45 and into the heat exchanger 46 in the second receiver 15 to receive additional thermal energy. The heated propellant exits the heat exchanger and is routed into the exhaust nozzle 48 to produce thrust and move the satellite.

The present invention has several advantages. The combined thrust and power generator 10 can simultaneously generate thrust and electrical power by using the high-intensity 24 and low-intensity 25 regions of the solar image. Such use of the naturally varying intensity of the ambient solar image 100 optimizes the efficient use of radiant heat generated by the solar image. In other words, the low-intensity region of the solar image is not wasted, but is directed to electrical power generation which does not require the higher amount of thermal energy, while the high-intensity region is directed to thermal propulsion which requires the higher amount of thermal energy. In addition, the combination of functions reduces the size and mass of the generator, which reduces the expense of launching the satellite. No moving parts are required to alternate between two different power and thrust generation modes, increasing the reliability of the combined generator. A circular first and second radiant energy absorbing members 30, 42 match the circular solar image, thereby reducing any loss of the solar image that fails to hit an energy absorbing member. Pre-heating of the propellant reduces the thermal energy needed to achieve a target propellant temperature for the production of thrust.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A combined generator device for use in a satellite, said combined generator device capable of generating electrical power and thrust from an optical solar image including a high-intensity region and a low-intensity region, wherein the high-intensity region has a higher radiant solar energy intensity than the low-intensity region, said combined generator device comprising:
   a solar concentrator configured to focus and direct the regions of the optical image;
   a first receiver including a first radiant energy absorbing member positioned so as to receive the focused low-intensity region of the optical solar image, the receiver further comprising a thermal storage medium thermally coupled to the first radiant energy absorbing member to store thermal energy absorbed thereby;
   an electrical power generator thermally coupled to the first receiver and receiving thermal energy therefrom, the electrical power generator configured to convert the thermal energy into electrical power; and
   a thrust generator having a second receiver and a propellant supply, the second receiver including a second radiant energy absorbing member positioned so as to receive the focused high-intensity region of the optical solar image, the propellant supply thermally coupled with the second radiant energy absorbing member and receiving thermal energy therefrom so as to generate thermal propulsion.

2. A combined generator device of claim 1, wherein the solar concentrator includes a concave mirror and a pointing system supporting the mirror, wherein the pointing system is capable of repositioning the mirror so as to reflect and focus the optical solar image onto the receivers.

3. A combined generator device of claim 1, wherein the first radiant energy absorbing member defines a first cavity having an aperture positioned to receive the low-intensity region and wherein the second radiant energy absorbing member of the second receiver is positioned within the first cavity to receive the region of high-intensity.

4. A combined generator device of claim 3, wherein the first cavity defined by the first radiant energy absorbing member is a cylindrical cavity and wherein the second receiver is concentrically positioned within the first cavity.

5. A combined generator device of claim 4, wherein the thermal energy storage medium is layered around an outer surface of the first radiant energy absorbing member.

6. A combined generator device of claim 5, wherein the thermal energy storage medium is a solid medium.

7. A combined generator device of claim 5, wherein the thermal energy storage medium is constructed of a graphite material.

8. A combined generator device of claim 4, wherein the second radiant energy absorbing member is constructed of a refractory material.

9. A combined generator device of claim 8, wherein the refractory material is rhenium.

10. A combined generator device of claim 4, wherein the second radiant energy absorbing member defines a second cavity having an aperture.

11. A combined generator device of claim 10, wherein the thrust generator further includes a heat exchanger thermally coupled with the second radiant energy absorbing member, said heat exchanger connected in fluid communication with the propellant supply and heating propellant passing therethrough.

12. A combined generator device of claim 11, wherein the thrust generator further includes a pre-heat exchanger thermally coupled with the first radiant energy absorbing member, said pre-heat exchanger connected in fluid communication with the propellant supply upstream of the heat exchanger and pre-heating propellant passing therethrough.

13. A combined generator device of claim 12, wherein the thrust generator further includes a thrust nozzle in fluid communication with the propellant supply downstream from the heat exchanger.

14. A combined generator device of claim 1, wherein the solar concentrator is configured to focus the optical solar image onto a focal plane and wherein the first and second energy absorbing members are positioned at the focal plane.

15. A solar power receiver assembly for converting an optical solar image into thermal energy for use by a thrust generator and an electrical power generator, said optical solar image including a high-intensity region and a low-intensity region wherein the high-intensity region has a higher radiant solar energy intensity than the low-intensity region, said combined generator device comprising:

a solar concentrator configured to focus and direct the regions of the optical image;

a first receiver including a first radiant energy absorbing member positioned so as to receive the focused low-intensity region of the optical solar image, the receiver further comprising a thermal storage medium thermally coupled to the first radiant energy absorbing member to store thermal energy absorbed thereby; and a second receiver including a second radiant energy absorbing member positioned so as to receive the focused high-intensity region of the optical solar image wherein said electrical power generator is thermally coupled to the first receiver and converts thermal energy from the first receiver into electrical power and wherein said thrust generator is thermally coupled to the second receiver and uses thermal energy from the second receiver to produce thrust.

16. A combined generator device of claim 15, wherein the solar concentrator includes a concave mirror and a pointing system supporting the mirror, wherein the pointing system is capable of repositioning the mirror so as to reflect and focus the optical solar image onto the receivers.

17. A combined generator device of claim 15, wherein the first radiant energy absorbing member defines a first cavity having an aperture positioned to receive the low-intensity region and wherein the second radiant energy absorbing member of the second receiver is positioned within the first cavity to receive the region of high-intensity.

18. A combined generator device of claim 17, wherein the first cavity defined by the first radiant energy absorbing member is a cylindrical cavity and wherein the second receiver is concentrically positioned within the first cavity.

19. A combined generator device of claim 18, wherein the thermal energy storage medium is constructed of a graphite material layered around an outer surface of the first radiant energy absorbing member.

20. A combined generator device of claim 18, wherein the second radiant energy absorbing member defines a second cavity having an aperture positioned so as to receive the high intensity region.

21. A combined generator device of claim 15, wherein the second radiant energy member is constructed of rhenium.

22. A combined generator device of claim 15, wherein the solar concentrator is configured to focus the optical solar image onto a focal plane and wherein the first and second energy absorbing members are positioned at the focal plane.

* * * * *